US012809801B2

(12) United States Patent
Mills

(10) Patent No.: US 12,809,801 B2
(45) Date of Patent: Nov. 24, 2026

(54) INPUT AND OUTPUT SPATIAL CROPPING OPERATIONS IN NEURAL PROCESSOR CIRCUITS

(71) Applicant: Apple Inc., Cupertino, CA (US)

(72) Inventor: Christopher L. Mills, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 157 days.

(21) Appl. No.: 18/616,772

(22) Filed: Mar. 26, 2024

(65) Prior Publication Data

US 2024/0330217 A1 Oct. 3, 2024

Related U.S. Application Data

(60) Provisional application No. 63/454,901, filed on Mar. 27, 2023.

(51) Int. Cl.
*G06F 13/00* (2006.01)
*G06F 13/28* (2006.01)

(52) U.S. Cl.
CPC ...... *G06F 13/28* (2013.01); *G06F 2213/2806* (2013.01)

(58) Field of Classification Search
CPC ........................................................ G06F 13/28
See application file for complete search history.

(56) References Cited

U.S. PATENT DOCUMENTS 12,277,494 B2 * 4/2025 Mills ...................... G06N 3/084
2023/0281960 A1 * 9/2023 Kim .......................... G06T 9/00
382/190

FOREIGN PATENT DOCUMENTS

EP 3480745 A1 * 5/2019 ........... G06F 17/153

* cited by examiner

*Primary Examiner* — Tammara R Peyton
(74) *Attorney, Agent, or Firm* — Sterne, Kessler, Goldstein & Fox P.L.L.C.

(57) ABSTRACT

An SoC circuit includes a neural processor circuit coupled to a CPU. The neural processor circuit includes neural engines, a data processor DMA circuit, a system memory, and a data processor circuit. The CPU is configured to execute a compiler, which is in turn configured to determine to perform a mode of spatial cropping and the associated crop offset. The neural processor circuit is configured to support arbitrary cropping in the x and y dimensions. The compiler is configured to generate task descriptor(s), the task descriptor(s) distributed to components of the neural processor circuit. The data processor DMA circuit is configured to fetch and format data corresponding to the crop from a source to the buffer. The buffer is configured to realign the data according to the crop origin for broadcast to the neural engines. The neural engines is configured to perform a computation operation which uses the cropped data.

20 Claims, 9 Drawing Sheets

INPUT AND OUTPUT SPATIAL CROPPING OPERATIONS IN NEURAL PROCESSOR CIRCUITS

CROSS-REFERENCE TO RELATED APPLICATION(S)

This application claims priority under 35 U.S.C. § 119 (e) to U.S. Provisional Patent Application No. 63/454,901, filed on Mar. 27, 2023, which is incorporated by reference herein in its entirety.

BACKGROUND

Field of the Disclosure

The present disclosure relates to a circuit for performing operations related to neural networks, and more specifically to fetching of data in neural processor circuits.

Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning techniques that primarily uses convolution between input data and kernel data, which can be decomposed into multiplication and accumulation operations.

Depending on the types of input data and operations to be performed, these machine learning systems or models can be configured differently. Such varying configurations would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

Electronic devices that are equipped with a neural processor specialized in performing computations related to machine learning models have become increasingly more common. Machine learning operations often involve several computation operations and a large amount of data, and therefore, access to data can become a bottleneck for the entire process.

Slow access to data could adversely impact the performance of a neural processor.

SUMMARY

Embodiments relate to a system-on-a-chip circuit that includes a central processing unit (CPU) and a neural processor circuit. The neural processor circuit may include a data processor circuit, a data processor direct memory access (DMA) circuit, a system memory, a plurality of neural engines. The data processor circuit includes a data control circuit and a buffer. The CPU is configured to execute a compiler, which is in turn configured to determine to perform a mode of spatial cropping and the associated crop offset. The neural processor circuit is configured to support arbitrary cropping in the x dimension and in the y dimension. The compiler is configured to generate one or more task descriptors, the task descriptors distributed to components of the neural processor circuit. The data processor DMA circuit is configured to fetch and format data corresponding to the crop from a source (e.g., system memory) to a destination (e.g., buffer). The buffer is configured to use a realignment shifter to realign the data according to the crop origin for broadcast to the plurality of neural engines. The plurality of neural engines is configured to perform a computation operation which uses the cropped data.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor circuit that may support multiple modes of spatial cropping. A system-on-a-chip circuit may include a neural processor circuit coupled to a central processing unit (CPU). The neural processor circuit may include a plurality of neural engines, a data processor direct memory access (DMA) circuit, a system memory, and a data processor circuit. The CPU is configured to execute a compiler, which is in turn configured to determine to perform a mode of spatial cropping and the associated crop offset. The neural processor circuit is configured to support arbitrary spatial cropping in the x dimension and in the y dimension. The arbitrary cropping allows the neural processor circuit to perform spatial tiling and divide layers to remain resident in the buffer, to avoid accesses to the system memory.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
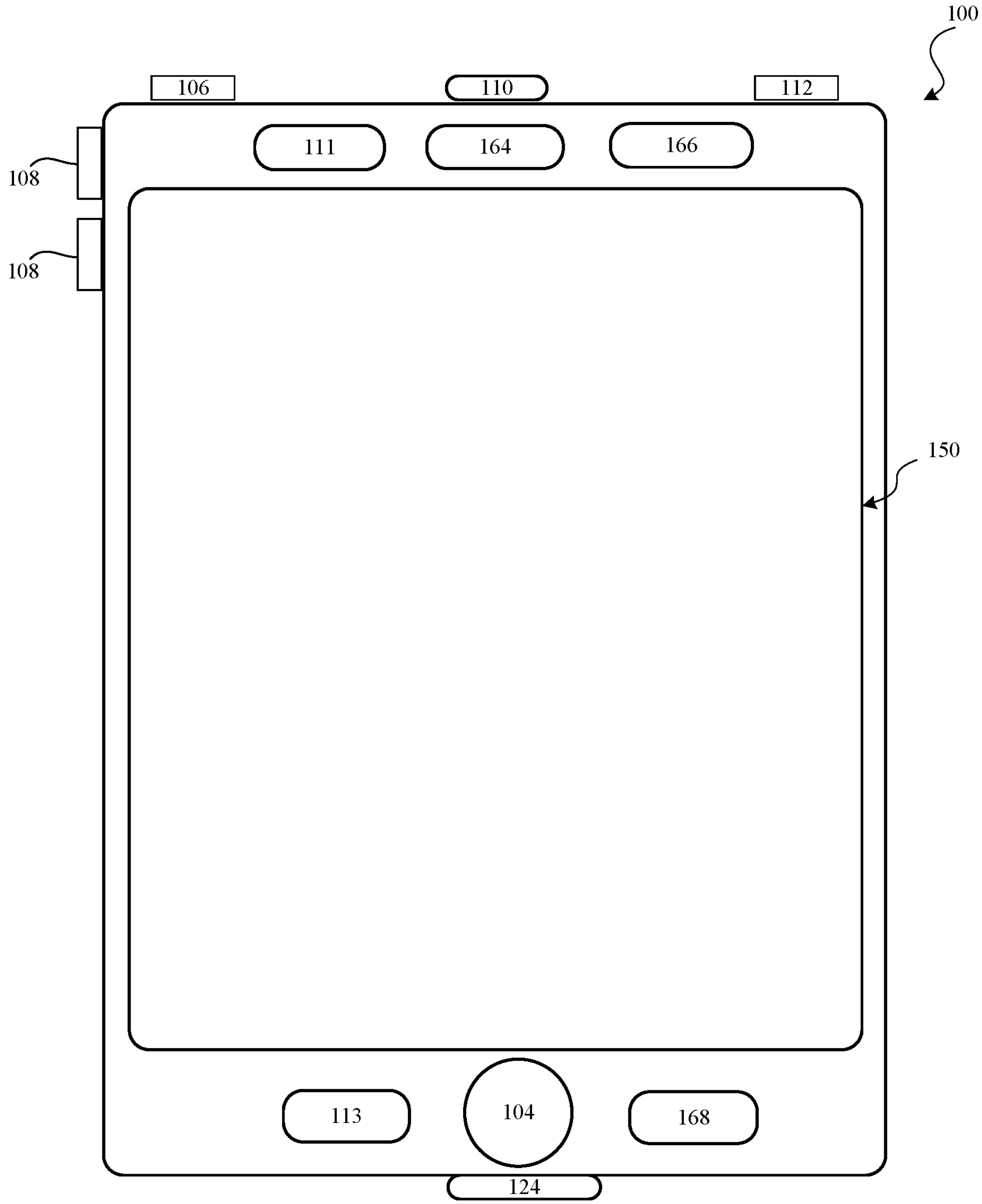
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

In some embodiments, device 100 may operate in different orientations. For example, device 100 detects the orientation that a user is holding device 100 (e.g., upright or sideways) and automatically rotates the contents displayed in touch screen 150. The software application for image sensors 164 such as the cameras may also rotate to allow users to capture images in a portrait mode and in a landscape mode. In some cases, the camera software application may also operate in rotations of 180 degrees and 270 degrees. Images generated by image sensors 164 may be in different rotations.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
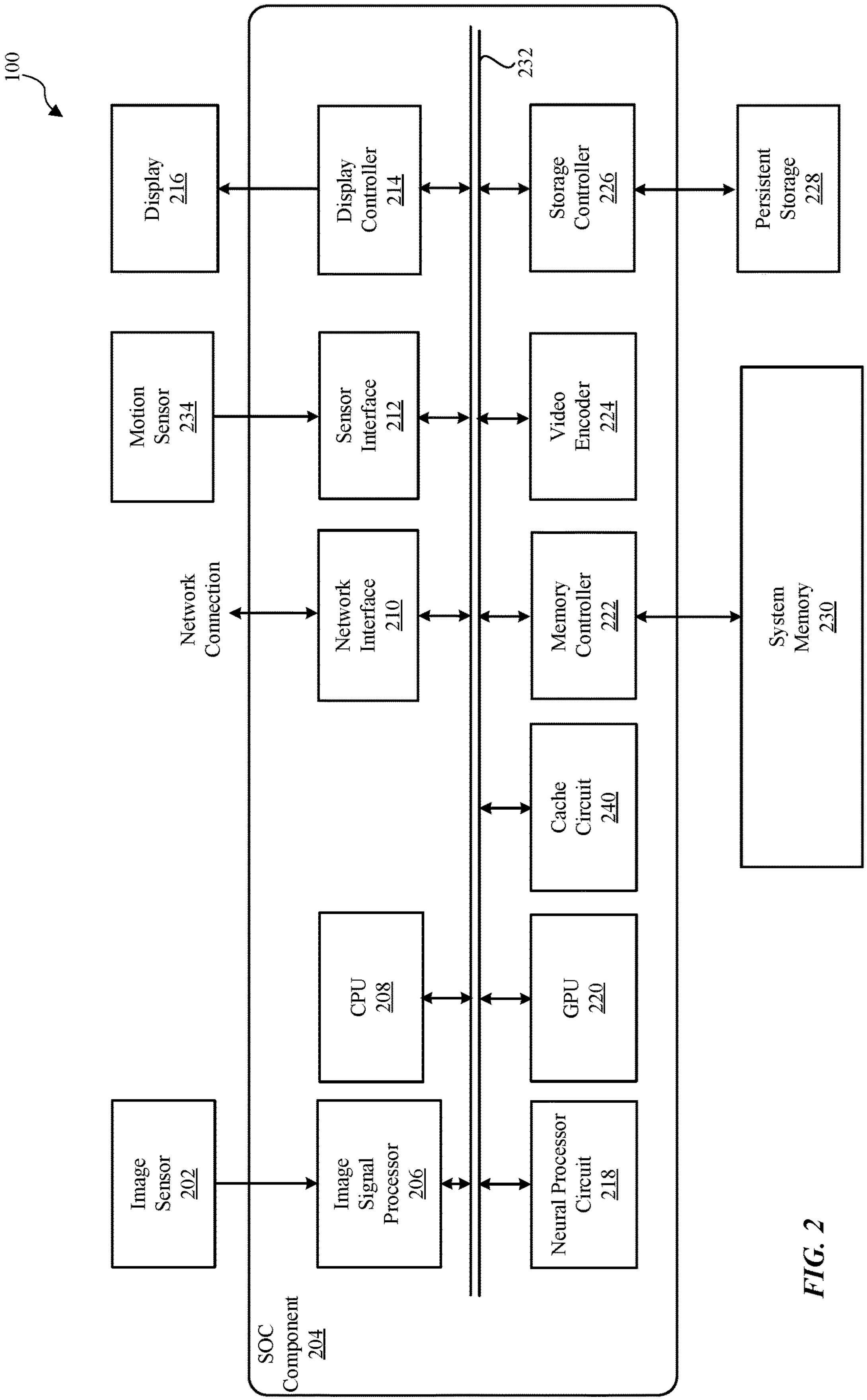
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern. Objects generated in the raw image data may be in different orientations. For example, a user may take a first image in a portrait mode, turn device 100 sideway, and take a second image in a landscape mode. The objects in the second image may appear to be turned 90 degrees compared to the first image.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random-access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processing unit (CPU) 208, a network interface 210, sensor interface 212, display controller 214, neural processor circuit 218, graphics processor (GPU) 220, memory controller 222, video encoder 224, storage controller 226, cache circuit 240, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Cache circuit 240 may be a system cache of SOC component 204. Cache circuit 240 may be located near the peripherals and the memory controller 222 and outside of CPU 208. Cache circuit 240 may be a faster, smaller, and closer to neural processor circuit 218 than the system memory 230. Cache circuit 240 caches data from system memory 230 and has a faster data rate than system memory 230. In one embodiment, cache circuit 240 may be a last-level cache that is shared by one or more processors such as CPU 208, GPU 220, image signal processor 206 and neural processor circuit 218. In other embodiments, cache circuit 240 may also have divided sections that are reserved for particular processors. Machine learning operations that are computed by neural processor circuit 218 may have large data sizes. Some of the processes may be system memory bandwidth bound. Cache circuit 240 increases the data access rate to improve the performance of data-heavy processors such as neural processor circuit 218.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model. Performing inference or prediction may sometimes be referred to as the runtime of the machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function. The values in various kernels, node weights, activation functions, and other weights in a machine learning model may be referred to as coefficient data.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
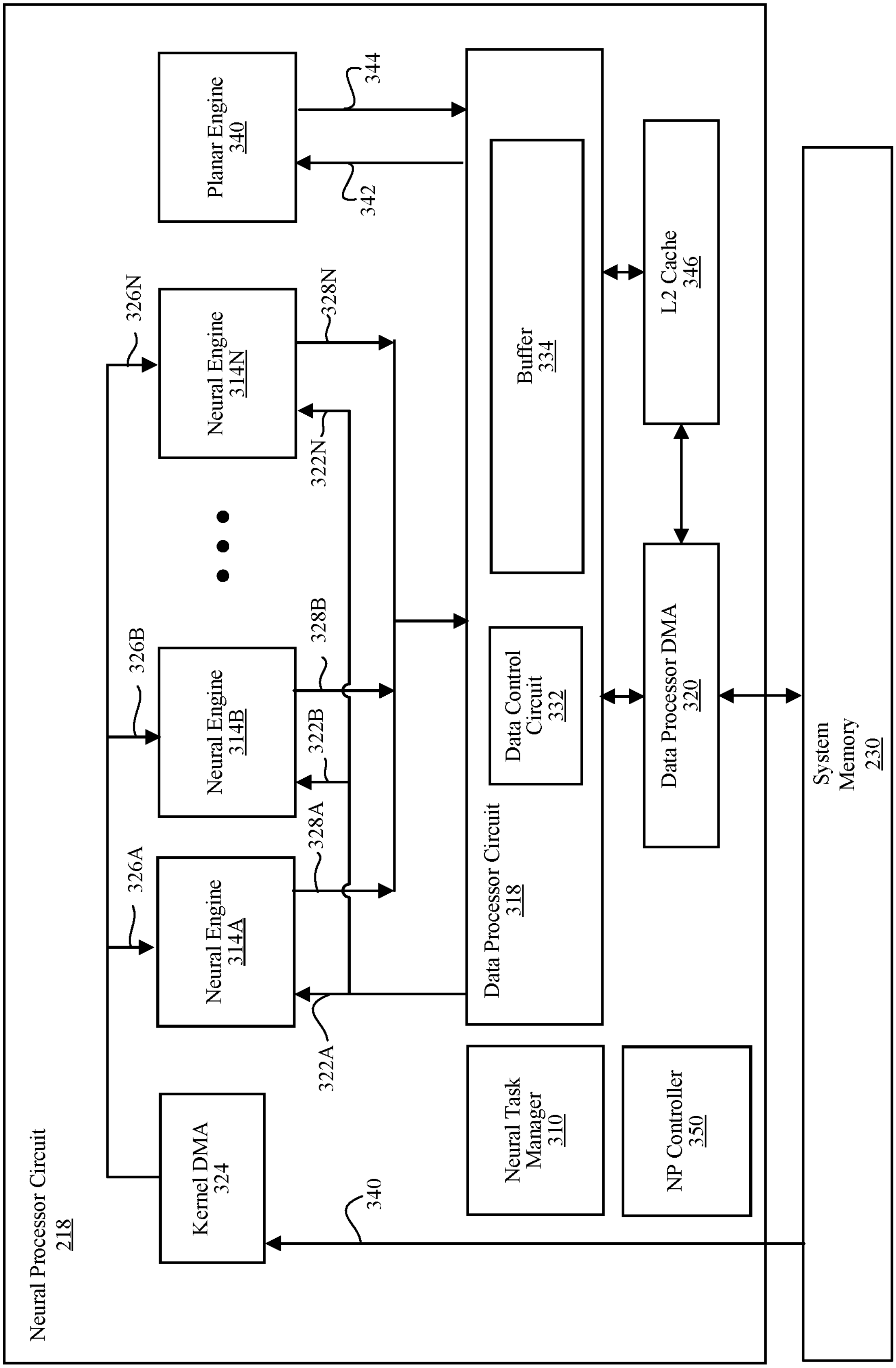
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, planar engine 340, neural processor (NP) controller 350, and a level 2 (L2) cache 346. Neural processor circuit 218 may include fewer components than what are illustrated in FIG. 3 or include additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. These computing operations may be referred to as 1/0 bound computations and are also referred to as "non-convolution operations" herein. In contrast, neural engines 314 may focus on complex computation such as convolution operations whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a data control circuit 332 and a buffer 334. Buffer 334 is temporary storage for storing data associated with operations of neural processor circuit 218, such as input data that is transmitted from system memory 230 (e.g., data from a machine learning model) and other data that is generated within neural processor circuit 218. The input data may be transmitted from system memory 230. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N (also referred to as "neural input data" herein) for feeding to corresponding neural engines 314A through 314N and input data 342 (also referred to as "planar input data" herein) for feeding to planar engine 340, as well as output data 328A through 328N from each of neural engines 314A through 314N (also referred to as "neural output data" herein) and output data 344 from planar engine 340 (also referred to as "planar output data" herein) for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as planar input data 342 to planar engine 340. Likewise, planar output data 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Data control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Data control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit (e.g., input DMA circuit) that receives a segment of the input data from a source (e.g., system memory 230) for storing in buffer 334, and a write circuit (e.g., output DMA circuit) that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208. In an embodiment, the data processor DMA 320 may perform spatial cropping. The input DMA circuit may perform input cropping, while the output DMA circuit may perform output cropping. The neural processor circuit 218 supports multiple modes of spatial cropping, the multiple modes including input cropping, output cropping and spatial tiling. Spatial cropping may be applied to common operations such as extracting a sub-image from a larger source image, slicing and concatenating tensors along spatial or non-spatial dimensions. Spatial cropping may also be used for spatial tiling, which includes breaking a neural network or sub-network into smaller portions, such that working tensors can remain resident in the buffer 334, and reduce slow and power-hungry data fetches from the system memory.

Spatial cropping may also be referred to as 'surface cropping'. A surface may refer to a physical mapping of a tensor to memory (e.g., system memory). A surface may be made up of one or more planes, which are two-dimensional arrays of data spanning in the x and y dimension. A resident surface may refer to surfaces that fit entirely in the buffer 334. A non-resident surface may refer to surfaces that are not present in the buffer 334, and may exist in other memory components of the neural processor circuit, such as the system memory 230 and data processor DMA buffer. In some embodiments, the buffer 334 may include a non-resident buffer. Resident layers may have a raster layout in the buffer 334, with channels interleaved by rows. Spatial cropping is further described below in FIG. 6 through 9.

In an embodiment, L2 cache 346 may store input and output crops for operations that are performed solely on resident tensors (e.g., tensors that are stored in L2 cache 346 and not moved to or from buffer 336 via data processor DMA 320.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Example Neural Engine Architecture

Figure 4:
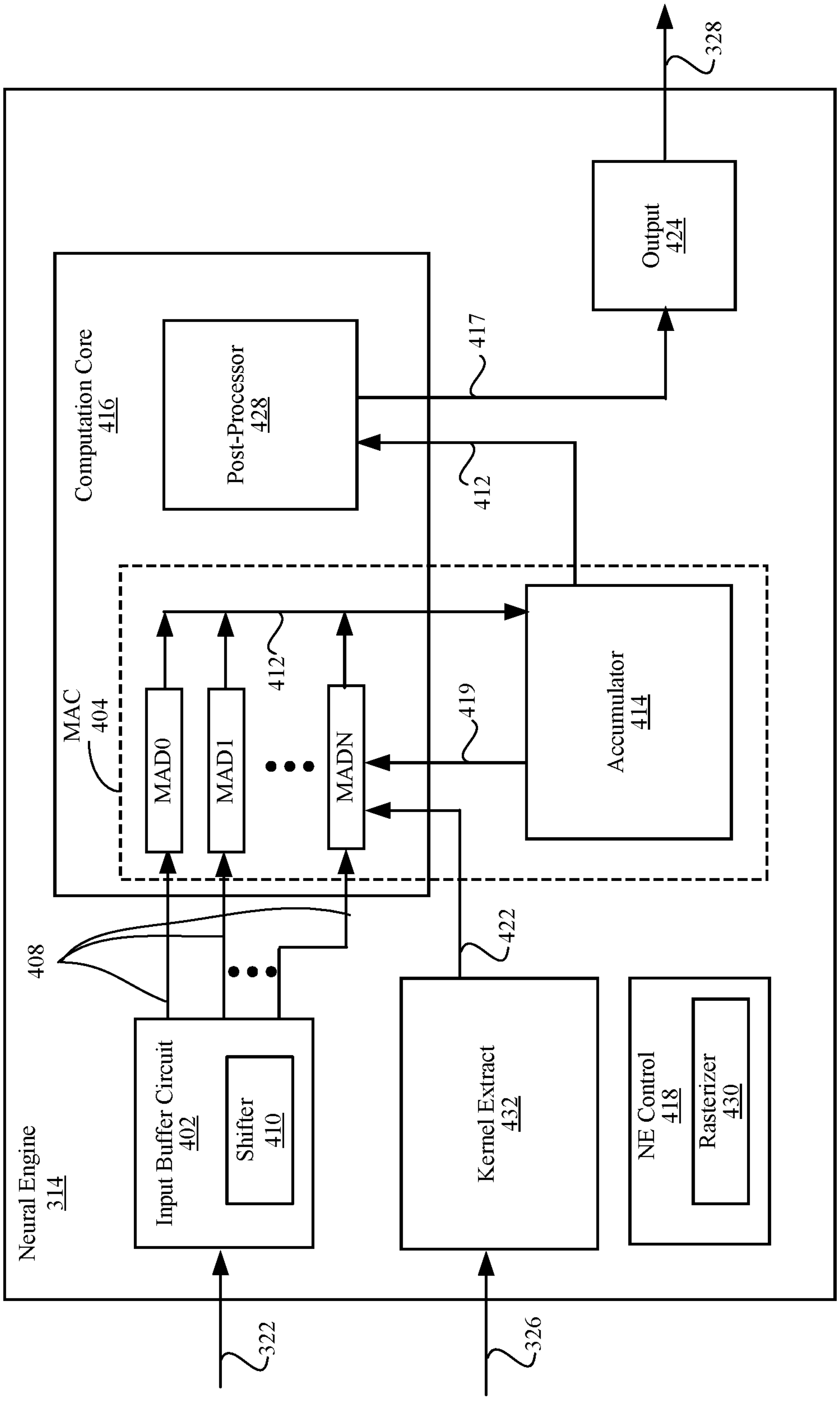
FIG. 4 is a block diagram of a neural engine in the neural processor circuit, according to one embodiment.

FIG. 4 is a block diagram of neural engine 314, according to one embodiment. Neural engine 314 is a circuit that performs various computational operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, mappable kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of different convolution groups and/or input channels.

Mappable kernel extract circuit 432 is a circuit that receives kernel data 326 and other coefficient data from kernel DMA 324 and extracts kernel coefficients 422. For convenience, data 326 is referred to as kernel data 326, but data 326 may also other coefficient data and the data may be processed in a manner similar to the kernel data by neural engine 314. In one embodiment, mappable kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, mappable kernel extract circuit 432 receives kernel data in an uncompressed format and the kernel coefficients are determined without referencing a LUT or using a mask.

The kernel data and other coefficient data, whether reconstructed from compressed data or fetched directly from kernel DMA 324, may be saved in coefficients buffer 450, which is a circuit that has different memory addresses for storing various values. The coefficient data may be a set of values that are stored in different memory addresses. For example, a 3×3 kernel has 9 different values of coefficient data that may be stored in different memory addresses of the coefficients buffer 450. Other types of coefficient data may include other sets of values, such as weights, activation coefficients, neuron coefficients of a machine learning model. A set of coefficient data that is read in a particular order may be provided to the MAC 404 as coefficients 422 for computation.

The same set of coefficient data may be generated as different mappings. The mappings may serve as different input coefficients 422 to be separately provided to the MAC 404 for different operating cycles. A coefficient organizing circuit 460 generates different mappings of the coefficient data by any suitable ways, such as by changing the read orders of memory addresses of the coefficients buffer 450 for a downstream computation circuit (e.g., MAC 404) to fetch the values saved in coefficients buffer 450 based on the different read orders. For example, in one case, a 3×3 kernel may be read row by row, which represents a first mapping of the kernel. In another case, the same kernel may be read column by column, which represents a second mapping of the kernel. The coefficient organizing circuit 460 may receive multiple control signals. Each control signal may correspond to a particular mapping. Based on the control signals, the coefficient organizing circuit 460 generates various read orders of the memory addresses. The same set of coefficient data may be used to generate different mappings for the computation of the MAC 404 with segments 408 of the input data. The generation of multiple mappings from a set of coefficient data reduces the size of the machine learning model because a set of values may be used to represent different kernels or other weight sets. This also speeds up the computation of the machine learning model in training and in runtime.

Computation core 416 is a programmable circuit that performs computation operations. For this purpose, computation core 416 may include MAD circuits MAD0 through MADN and a post-processing circuit 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processing circuit 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processing circuit 428.

Post-processing circuit 428 is a circuit that performs further processing of values 412 received from accumulator 414. Post-processing circuit 428 may perform operations including, but not limited to, applying linear functions (e.g., Rectified Linear Unit (ReLU)), normalized cross-correlation (NCC), merging the results of performing neural operations on 8-bit data into 16-bit data, local response normalization (LRN), and rounding. The result of such operations is output from post-processing circuit 428 as processed values 417 to output circuit 424. In some embodiments, the processing at the post-processing circuit 428 is bypassed. For example, the data in accumulator 414 may be sent directly to output circuit 424 for access by other components of neural processor circuit 218.

Computation core 416, the MAD circuits, accumulator 414, MAC 404, and post-processing circuit 428 are examples of different computation circuits in a neural engine 314.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processing circuit 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, data processor DMA 320, data buffer 334, planar engine 340) may also have their corresponding rasterizers to monitor the division of input data and the parallel computation of various segments of input data in different components.

Output circuit 424 receives processed values 417 from post-processing circuit 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processing circuit 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processing circuit 428.

Example Planar Engine Architecture

Figure 5:
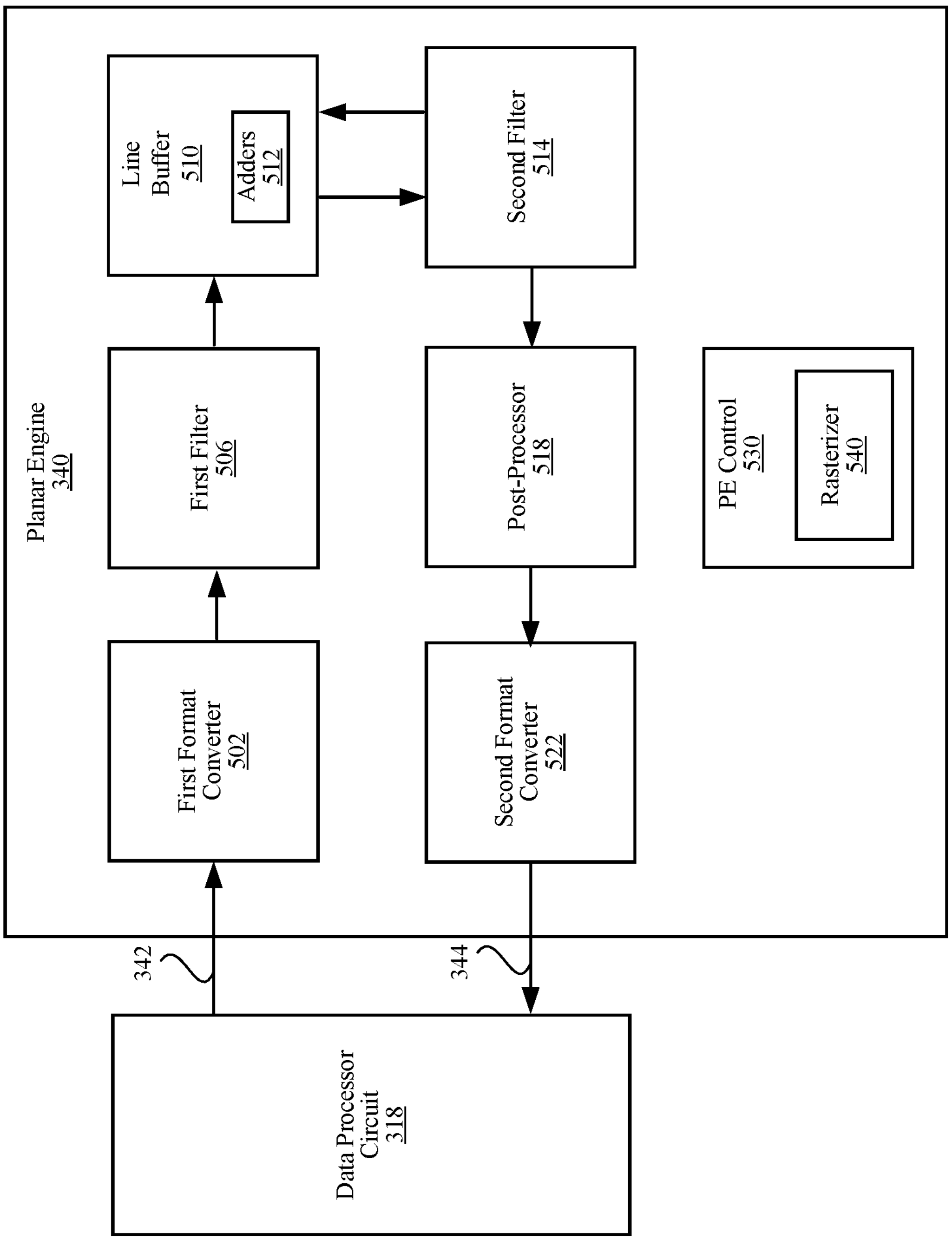
FIG. 5 is a block diagram of a planar engine in the neural processor circuit, according to one embodiment.

FIG. 5 is a block diagram of planar engine 340, according to one embodiment. Planar engine 340 is a circuit that is separated from neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processing circuit 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processing circuit 518 is a circuit that performs further processing of values fetched from other upstream components. Post-processing circuit 518 may include specialized circuits that are efficient at performing certain types of mathematical computations that might be inefficient to perform using a general computation circuit. Operations performed by post-processing circuit 518 may include, among others, performing square root operations and inverse of values in a reduction mode. Post-processing circuit 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Modes of Spatial Cropping

Figure 6:
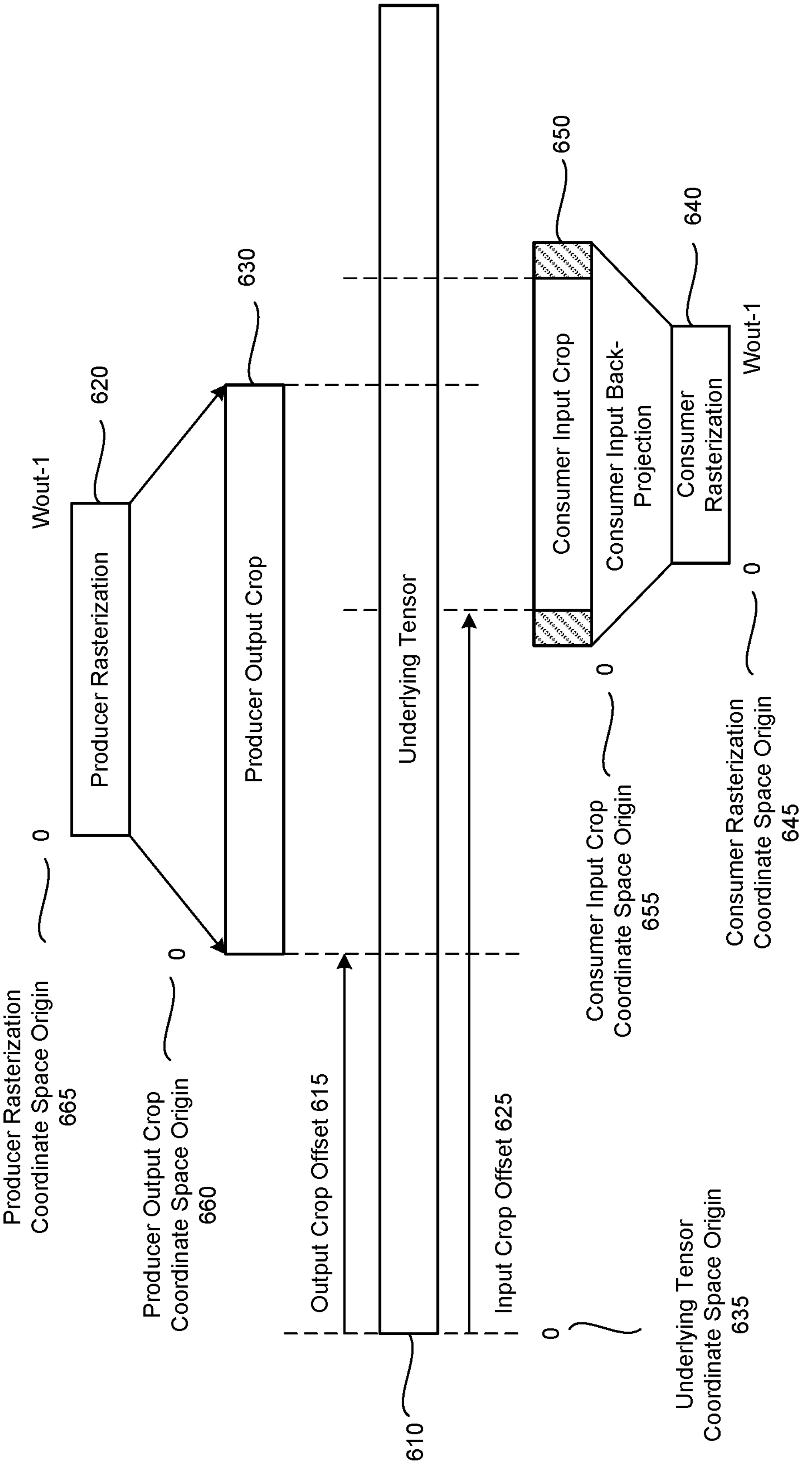
FIG. 6 is a conceptual diagram that illustrates the relationship between the coordinate systems of an underlying tensor and the associated input and output crop tensors, according to an embodiment.

FIG. 6 is a conceptual diagram that illustrates the relationship between the coordinate systems of an underlying tensor and the associated input and output crop tensors, according to an embodiment. The underlying tensor and individual consumer input and producer output crops each have their own coordinate systems. The coordinate system of the producer and consumer crops are offset from the underlying tensor by the crop offsets. The output crop offset 615 is used to adjust the spatial offset from the rasterization coordinate space 665. The producer output crop 630 is cropped from the underlying tensor 610 at an output crop offset 615. The output crop offset 615 is stored in a hardware register on the data processor DMA 320. It is noted that conceptual diagram FIG. 6 depicts a one-axis representation of the coordinate space, the conceptual diagram applies to all axes independently.

Output cropping mode may offset output coordinates of the output DMA circuit and/or the data processor circuit. In an embodiment, when operating in output crop mode, the neural processor circuit 218 may adhere to alignment requirements. For example, output crop offsets may be aligned to the granularity of the destination surface in the x dimension and in the y dimension. The granularity of the destination surface may also be referred to as 'output granularity'. The output granularity is surface and mode dependent. In an embodiment, the output crop may be written to the buffer, which may have an access granularity of 16-bytes. The output crop offset may be a multiple of 16-bytes to be aligned to the granularity of the buffer. The buffer 334 may have an access granularity of 16 bytes, or 8 bytes based on the output data type. The output data type may include integer format (e.g., INT8, UINT8) and floating-point format (e.g., FP16). In an embodiment, the alignment requirements of the output DMA circuit are dependent on the mode of the output DMA circuit. The dimensions of the output crop may be controlled by modifying the dimensions of the output data. Spatial tiling is a function of input and output cropping. Spatial tiling operations are defined in the rasterization coordinate system.

Access granularity may also be referred to as 'atoms'. Accesses may also be defined in terms of components. A component may have a variable number of bytes, for example, a component of a floating-point data type (e.g., FP32) may be four bytes. In contrast, a component of integer data type (e.g., INT8) may be 1 byte. Accordingly, a 64-byte atom may correspond to a variable number of components depending on the selected data type. Input and output tensors of a neural network may be composed of multiple components packed into a single plane in memory. Interleave determines the number of components packed into each plane.

Likewise, the consumer input crop coordinate system is offset from the coordinate system of the underlying tensor, as indicated by the consumer input crop coordinate space origin 655. The input crop offset 625 is used to adjust the spatial offset from the consumer rasterization coordinate space 640. The consumer rasterization crop 640 is back-projected through an input transform to determine the dimensions of the source data required for a computation operation. In the illustrated embodiment, the consumer input crop 650 indicates the portion of the underlying tensor 610 required for the operation.

Input cropping mode may offset input coordinates of the input DMA circuit and/or the data processor circuit. Input cropping mode allows region extraction of a source from a larger input tensor. Input crops may have arbitrary spatial alignment, as such, input crop offsets may be of any arbitrary value. The input crop offset may be stored in a data processor DMA 320 register and may be applied to both tiled and linear surfaces. Input cropping may be performed by the data processor circuit and the data processor DMA 320. In some embodiments, the input DMA circuit and data processor circuit 318 inherits the alignment of the underlying tensor.

For example, an input crop tensor that is unaligned to a destination surface (e.g., buffer 334) will be written unaligned to the destination surface. In some embodiments, padding values and the dimensions of the input data can be used to adjust the amount of padding on the edges of the input.

In some embodiments, different tasks may perform computation operations on different parts of the same underlying tensor. The data processor circuit 318 may perform dependency tracking across all performed crops (e.g., between the output crop resulting from one cropping task and the input crop for another cropping task). The data processor DMA 320 may use full crop offsets in the x and y dimension, and uses a pre-crop coordinate space. A pre-crop dependency tracking includes using crop offsets as an absolute value from the origin of the underlying tensor. Dependency tracking is performed in the underlying tensor coordinate space, and cropping offsets are added by the neural processor circuit before performing a dependency comparison. A post-crop dependency tracking includes using only a portion of a crop offset. Dependency tracking is performed in the post-crop coordinate space, and may be adjusted by a compiler programmed dependency offset to allow different coordinate spaces to be compared. In one embodiment, post-crop coordinates may be generated based on the pre-crop coordinates by adding the associated crop offsets and dynamically comparing them in three dimensions to avoid introducing data hazards (e.g., where a consumer reads data that the producer has not yet produced).

Figure 7:
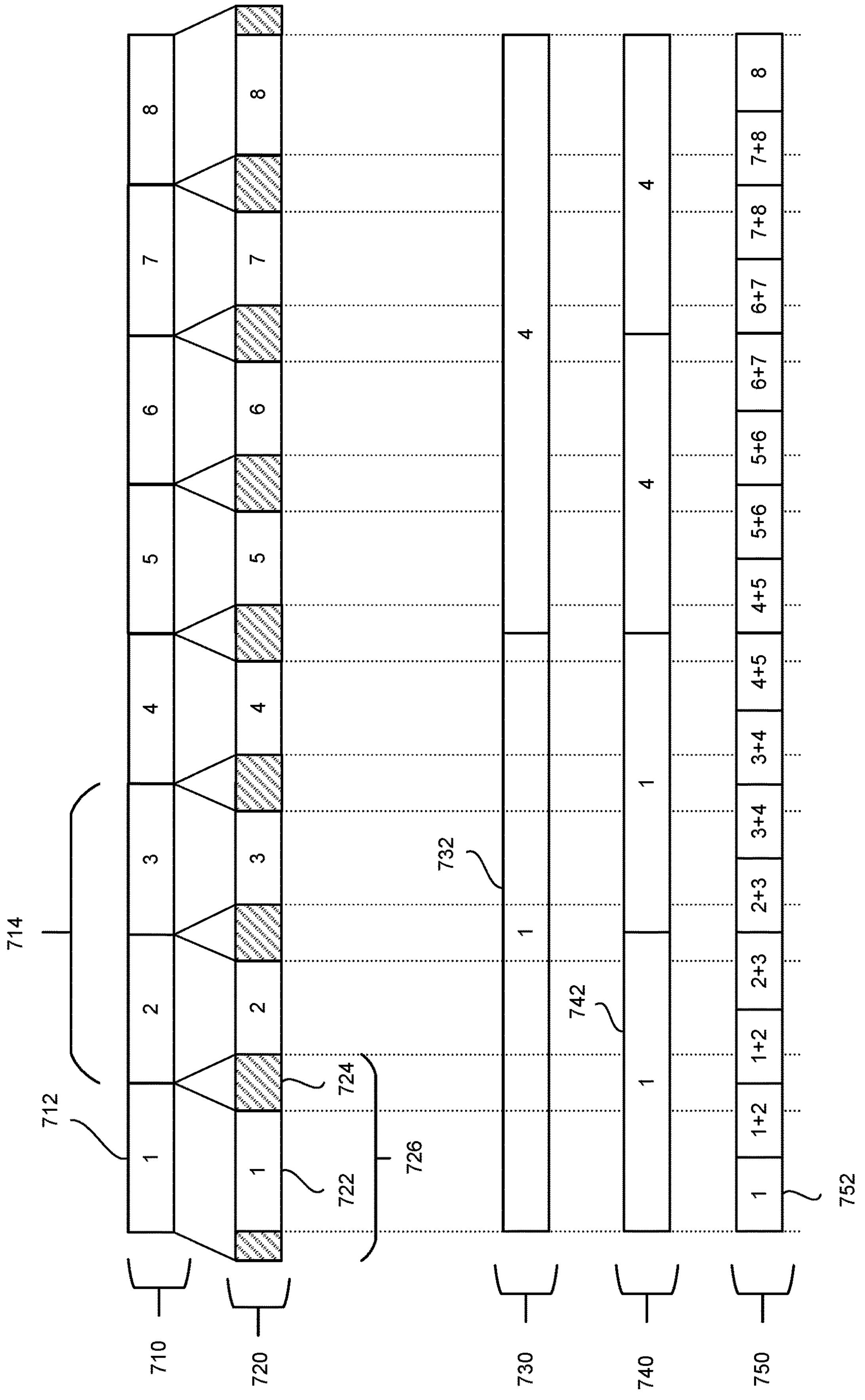
FIG. 7 is a conceptual diagram illustrating an exemplary non-cropping operation, according to an embodiment.

FIG. 7 is a conceptual diagram illustrating an exemplary non-cropping operation, according to an embodiment. The input DMA circuit fetches data from the system memory, formats the fetched data, and sends the data to L2 cache 346. L2 cache 346 may broadcast the formatted data to the plurality of neural engines 314. The data processor circuit, the buffer 334, L2 cache 346, and system memory 230 may have respective access granularities. The buffer 334 and/or L2 cache 346 may have a push access granularity and a broadcast granularity.

The push access granularity may refer to the size of data transmitted between the data processor DMA 320 and L2 cache 346 and from L2 cache 346 to buffer 334. The broadcast granularity may refer to the size of data broadcasted by L2 cache 346 from buffer 334 to the plurality of neural engines 314.

Referring to FIG. 7, eight output work units 710 are illustrated. The output work units 710 are back-projected to eight input work units 720. For example, output work unit 712 is back-projected to the first input work unit 726. The dimensions of the first work unit to be fetched is determined by the larger of the two: input DMA circuit granularity and the buffer 334 and/or L2 cache 346 granularity. In the illustrated embodiment, the data processor DMA access granularity (e.g., 64×1) is larger than that of the buffer 334 and/or L2 cache 346 (e.g., 16×1). The input DMA circuit fetches a block of data 732 from the system memory, the block of data 732 including additional data (e.g., overfetched data) due to the input DMA circuit access granularity. The overfetched data may be provided to L2 cache 346, which stores the overfetched data in the buffer 334 for the subsequent computation operation. The overfetched data includes the second and third work unit 714. The input DMA circuit may convert the data type of the work units for transmission to the buffer 334 (via L2 cache 346). The data processor DMA 320 may de-interleave data for transmission to the buffer 334 (via L2 cache 346). The input DMA circuit rasterizer may transmit the work units to the L2 cache 346 according to the push access granularity 742 of the L2 cache 346, and L2 cache 346 may transmit the works units to buffer 334 according to the push access granularity 742 of buffer 334. The push granularity 742 of the buffer 334 and/or L2 cache 346 may be dynamically sized based in part on the width of the tensor. The data processing circuit may perform realignment and padding on the input data to match the padding required for the computation operation. The data processor circuit 318 rasterizer may divide the fetched data into blocks for broadcast to the plurality of neural engines 314. L2 cache 346 may store the blocks in buffer 334 and may broadcast the blocks from buffer 334 to the plurality of neural engine 314.

The input DMA 320 does not need to fetch from the system memory 230 for the second and third work units 714 as they were already included in the overfetched data. The data processor circuit 318 may use a realignment shifter to realign the data for broadcast to the neural engines 314 if a work unit starts at an unaligned offset. The process is repeated for the remaining work units.

Figure 8:
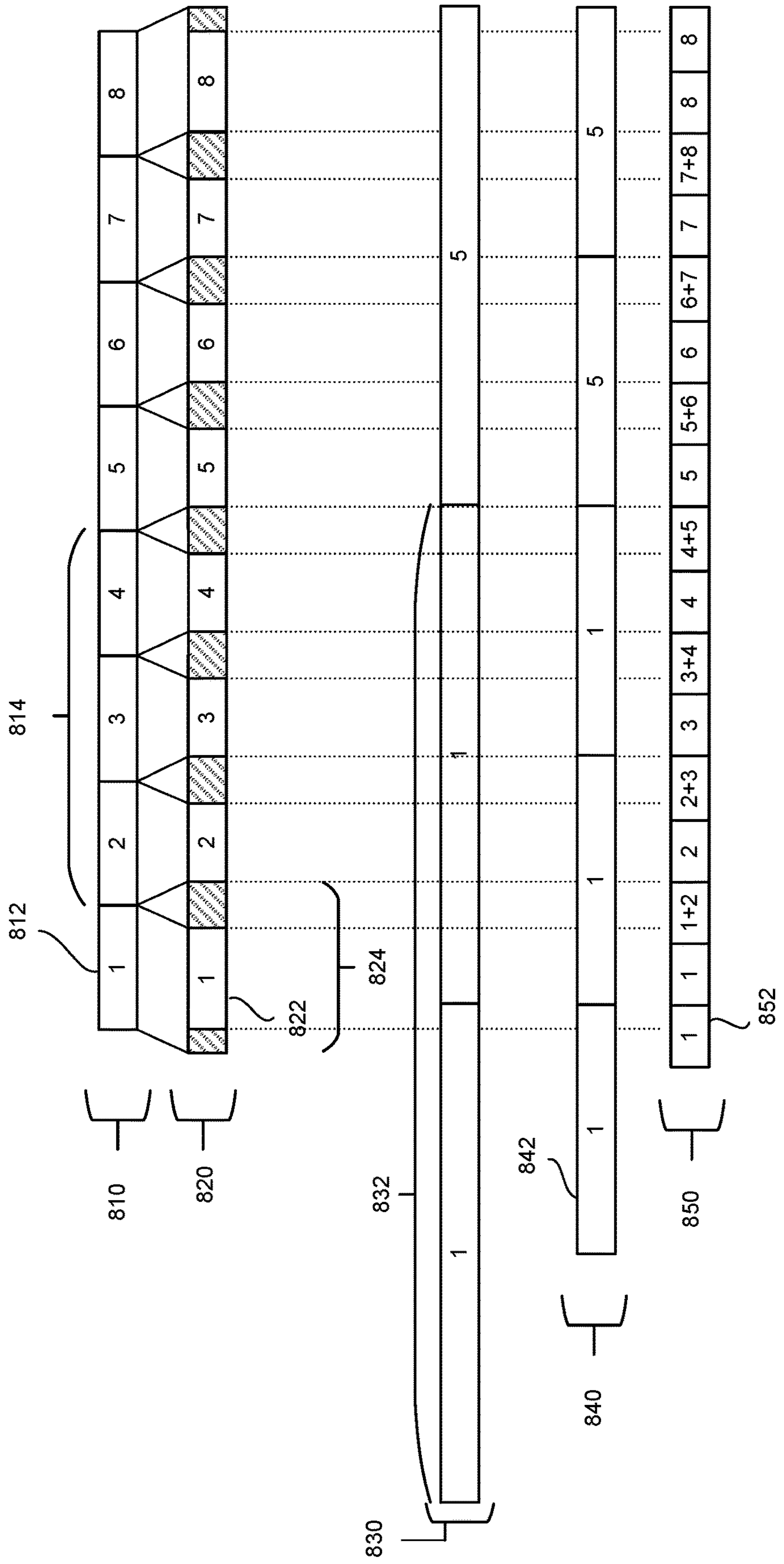
FIG. 8 is a conceptual diagram illustrating an unaligned spatial crop in the x dimension, according to an embodiment.

FIG. 8 is a conceptual diagram illustrating an unaligned spatial crop in the x dimension, according to an embodiment. The input DMA 320 and buffer 334 are configured to perform spatial cropping in the x dimension. The data processor DMA and the buffer 334 include registers that indicate the crop offset in the x and y dimensions for both input DMA circuit and output DMA circuit. The input DMA circuit and output DMA circuit are configured to perform crops simultaneously.

In the illustrated embodiment, the crop offset in the x dimension is 63 bytes, which is the last byte in the first DMA atom 832. Like the previously described embodiment in FIG. 7, eight output work units 810 are illustrated. The access granularity of the data processor DMA 320 may be 64 bytes, while the access granularity of the buffer 334 may be 16 bytes. The buffer 334 push access granularity may be 64 bytes, and the buffer 334 broadcast granularity may be 128 bytes. The output work units 810 are back-projected to eight input work units 820. For example, output work unit 812 is back-projected to the first input work unit 824. Due to the alignment of the crop, the input DMA circuit fetches two blocks of data 832 from the system memory, the blocks of data 832 including overfetched data. While the input DMA circuit fetches two blocks of data 832 from the system memory, not all the data is processed and transmitted to the buffer 334 (via L2 cache 346). The data outside crop parameters may be referred to as "out of bounds". As illustrated, only the buffer atom 842 comprising the first byte of the crop is pushed to the buffer 334 (via L2 cache 346), while the first half of the first input DMA atom (e.g., byte columns 0 to 31) which are out of bounds, is discarded. As such, the first push to the buffer 334 comprises byte columns 32 to 63 of the first input DMA atom.

The data processor circuit 318 receives byte columns 32 to 63 from the input DMA circuit. The data processor circuit 318 discards the byte columns that are before the crop origin (e.g., column 32 to 55) as they are out of bounds and does not store them in the buffer 334 (via L2 cache 346). The data processor DMA 320 is configured to identify the overfetched data that are out of bounds to avoid performing unnecessary work on the data. Likewise, while byte columns 56 to 62 are stored in the buffer 334, they will not be used by the neural engines 314. Accordingly, of the original 128 columns fetched by the input DMA circuit, 32 columns are discarded by the input DMA circuit, and another 24 columns are discarded by the data processor circuit. The buffer 334 stores the remaining 8 bytes in its first bank 852.

The data processor circuit 318 may use the realignment shifter to align the data to start at the crop origin (e.g., column 7 of the buffer atom). In contrast to the embodiment in FIG. 7, the realignment shifter uses a different alignment shift, based on the crop offset. L2 cache 346 broadcasts the data in the first bank 852 to the neural engines. The input DMA does not need to fetch from system memory 230 for the second, third, and fourth work unit 814. This process is repeated for the rest of the work units.

It is noted that unaligned spatial cropping may be performed in the y dimension in a similar manner, as described above with reference to unaligned spatial cropping in the x dimension (as described above with reference to FIG. 8). In the case of a compressed surface, which may be stored as tiles (and therefore, have a non-unit granularity in the y dimension), the overfetched data (e.g., overfetched by a four-row y dimension granularity) fetched by the input DMA circuit is discarded and not transmitted to L2 cache 346 (for storing in buffer 334)

Example Data Flow Determination Process

Figure 9:
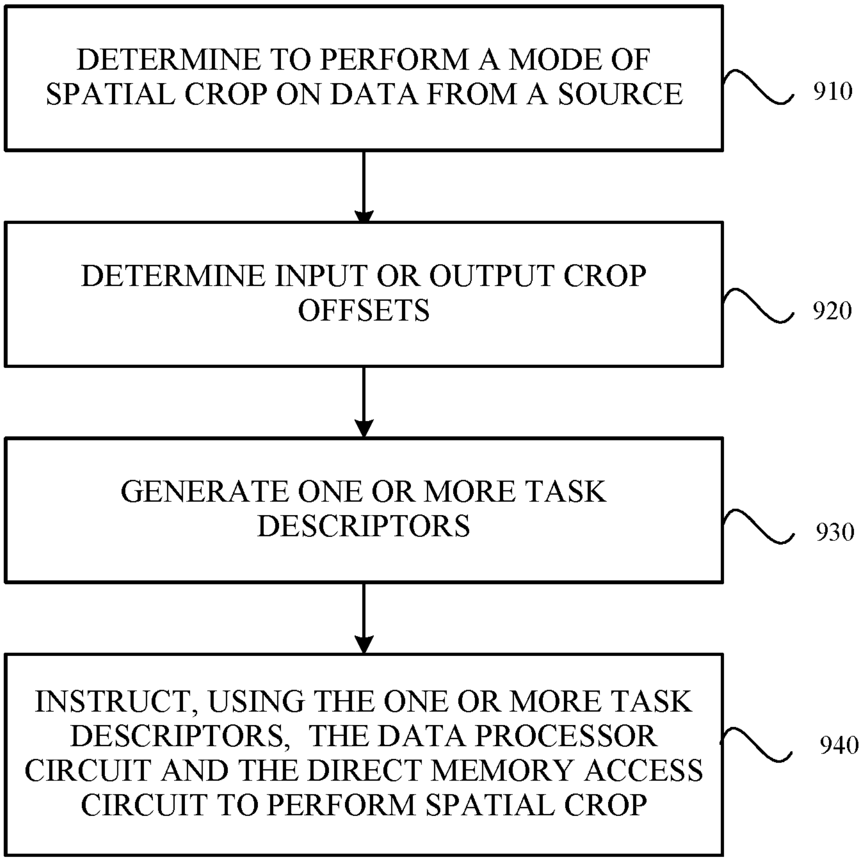
FIG. 9 is a flowchart depicting an example process for determining data flow associated with a neural processor circuit, according to an embodiment.

FIG. 9 is a flowchart depicting an example process for determining data flow associated with a neural processor circuit, according to an embodiment. The process may be performed by various components in an electronic device 100 in executing the code instructions associated with a neural network. The process determines what tasks are to be executed in running the neural network and how data are provided to neural processor circuit 218.

In one embodiment, in executing a neural network, tasks that need to be executed, such as convolution operation tasks, pooling tasks, etc. may be defined in by a compiler. A compiler may define a first task that corresponds to a first operation in a first layer of the neural network and a second task that corresponds to a second operation in a second layer of the neural network. Certain structures and data sizes of the neural network are defined in the code instructions associated with the neural networks. As such, the sizes of certain data in various layers, such as kernel data, may be predetermined and known to the compiler.

The compiler may determine 910 to perform a mode of spatial crop on data from a source. The compiler may receive a request from an application, the request associated to perform a mode of spatial crop on input data, such as a tensor. The request may be associated to performing spatial tiling on a network and divide the network such that layers may fit entirely in the buffer 334. The compiler may also determine to perform input or output cropping based in part on a neural network description. For example, the compiler may determine to divide a network such that layers may fit entirely in the buffer 334 for improved performance.

The compiler may determine 920 the input or output crop offsets. The compiler may receive an explicit input or output crop offset from a request from an application. The compiler may also determine, based in part on a neural network description, the appropriate input or output crop offset.

The compiler may also generate 930 one or more task descriptors for one or more tasks. A task descriptor includes a set of metadata that is used to describe a task. The metadata may define data size and location, task operations, prefetch instructions, data broadcasting mode, and input data dimension configuration mode. A task descriptor defines a configuration of components in the neural processor circuit 218 to execute the task associated with the task descriptor. Each task descriptor for a task may include a task descriptor header and configuration registers. The task descriptor header comprises configurations related to the task manager's behavior for the task.

For example, the task descriptor header may be written at the beginning of each task descriptor. The task descriptor header includes a plurality of fields. The fields may include a task ID, a network ID, an estimated number of operating cycles required to execute the task to execute, a prefetch instruction that indicates whether the input data should be prefetched, data size and location, spatial cropping mode, and input and output offsets.

The compiler may instruct 940, using the one or more task descriptors, the data processor circuit 318 and the direct memory access circuit to perform spatial crop according to the determined input or output crop offsets. The task descriptors are sent to the neural task manager 310 of neural processor circuit 218 to set the operations of the neural task manager 310 and other components of neural processor circuit 218. The task descriptors may configure the registers in the data processor DMA 320 to indicate an input crop offset and an output crop offset in the x and y dimensions, for both input DMA circuit and output DMA circuit. In an embodiment, the task descriptor may also configure the registers in the data processor circuit 318 to indicate the input crop offset and output crop offset. The data processor circuit 318 uses the least significant bits (LSBs) of the crop offset to determine the blocks of data to fetch from the buffer 334. The procedure to perform spatial cropping is described above in FIG. 8.

While particular embodiments and applications have been illustrated and described, it is to be understood that the embodiments described herein are not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A system-on-a-chip circuit, comprising:

a neural processor circuit, comprising:

- a data processor circuit configured to perform multiple modes of spatial crop; and
- a direct memory access circuit coupled to the data processor circuit and a system memory, the direct memory access circuit configured to access the system memory and perform the multiple modes of spatial crop; and a central processing unit configured to:

- determine to perform a mode, of the multiple modes, of spatial crop on data from a source;
- determine input or output crop offsets, the input or output crop offsets indicating a chosen subset of the data;
- generate one or more task descriptors, a task descriptor of the one or more task descriptors indicating the mode of spatial crop and the determined input or output crop offsets; and
- instruct, using the one or more task descriptors, the data processor circuit and the direct memory access circuit to perform the mode of spatial crop on the data according to the determined input or output crop offsets.

2. The system-on-a-chip circuit of claim 1, the direct memory access circuit comprising:

a read circuit configured to fetch input data from the system memory and store the input data into a buffer; and a write circuit configured to write data from the buffer to the system memory.

3. The system-on-a-chip circuit of claim 2, wherein the system memory and the buffer each have an associated access granularity, the access granularity of the system memory being larger than the access granularity of the buffer.

4. The system-on-a-chip circuit of claim 2, wherein the multiple modes of spatial crop comprise:

an input cropping mode, wherein the input cropping mode includes extracting a subset of data from an input tensor at an arbitrary position using an input crop offset;

an output cropping mode, wherein the output cropping mode includes writing the data to the buffer using an output crop offset; and a spatial tiling mode, wherein the spatial tiling mode is a function of the input cropping mode and the output cropping mode.

5. The system-on-a-chip circuit of claim 1, wherein output crop offsets used in an output cropping mode are aligned to an output granularity, and wherein the output granularity is an access granularity of a destination surface.

6. The system-on-a-chip circuit of claim 1, wherein the data processor circuit comprises a realignment shifter circuit configured to perform shifting of the data by a specified number of places in a given direction.

7. The system-on-a-chip circuit of claim 6, wherein, to perform the mode of spatial crop, the data processor circuit is configured to:

receive the data from the source, the data including data associated with a spatial crop and additional overfetched data;

discard the additional overfetched data;

shift the data associated with the spatial crop, using the realignment shifter circuit, to realign the data associated with the spatial crop according to an access granularity of a buffer; and broadcast the realigned data to a plurality of neural engines coupled to the data processor circuit.

8. The system-on-a-chip circuit of claim 1, wherein, to perform the mode of spatial crop, the direct memory access circuit is configured to:

fetch the data from the source, the data including data associated with a spatial crop and additional overfetched data;

discard the additional overfetched data; and broadcast the data associated with the spatial crop to a destination.

9. The system-on-a-chip circuit of claim 1, wherein the data processor circuit is further configured to track spatial crops performed by the direct memory access circuit and the data processor circuit.

10. A computer-implemented method, comprising:

determining to perform a mode of spatial crop, from a plurality of modes of spatial crop, on data from a source;

determining input or output crop offsets, the input or output crop offsets indicating a chosen subset of the data;

generating one or more task descriptors, a task descriptor of the one or more task descriptors indicating the mode of spatial crop and the determined input or output crop offsets; and instructing, using the one or more task descriptors, a data processor circuit of a neural processor circuit and a direct memory access circuit of the neural processor circuit to perform the mode of spatial crop on the data according to the determined input or output crop offsets, wherein the direct memory access circuit is configured to access system memory.

11. The computer-implemented method of claim 10, wherein the system memory and a buffer each have an associated access granularity, the access granularity of the system memory being larger than the access granularity of the buffer.

12. The computer-implemented method of claim 11, wherein the plurality of modes of spatial crop comprises:

an input cropping mode, wherein the input cropping mode includes extracting a subset of data from an input tensor at an arbitrary position using an input crop offset;

an output cropping mode, wherein the output cropping mode includes writing the data to the buffer using an output crop offset; and a spatial tiling mode, wherein the spatial tiling mode is a function of the input cropping mode and the output cropping mode.

13. The computer-implemented method of claim 10, wherein output crop offsets used in an output cropping mode are aligned to an output granularity, and wherein the output granularity is an access granularity of a destination tensor.

14. The computer-implemented method of claim 11, wherein, to perform the mode of spatial crop, the data processor circuit is configured to:

receive the data from the source, the data including data associated with a spatial crop and additional overfetched data;

discard the additional overfetched data;

shift the data associated with the spatial crop, using a realignment shifter circuit, to realign the data associated with the spatial crop according to an access granularity of the buffer; and broadcast the realigned data to a plurality of neural engines via one or more data buses.

15. The computer-implemented method of claim 10, wherein, to perform the mode of spatial crop, the direct memory access circuit is configured to:

fetch the data from the source, the data including data associated with a spatial crop and additional overfetched data;

discard the additional overfetched data; and broadcast the data associated with the spatial crop to a destination via one or more data buses.

16. The computer-implemented method of claim 10, wherein the data processor circuit is further configured to track spatial crops performed by the direct memory access circuit and the data processor circuit.

17. An electronic device, comprising:

a system memory configured to store a neural network; and a neural processor circuit, comprising:

a data processor circuit configured to perform multiple modes of spatial crop; and a direct memory access circuit coupled to the data processor circuit and the system memory, the direct memory access circuit configured to access the system memory and perform the multiple modes of spatial crop; and a central processing unit configured to:

determine to perform a mode, of the multiple modes of spatial crop on data from a source;

determine input or output crop offsets, the input or output crop offsets indicating a chosen subset of the data;

generate one or more task descriptors, a task descriptor of the one or more task descriptors indicating the mode of spatial crop and determined input or output crop offsets; and instruct, using the one or more task descriptors, the data processor circuit and the direct memory access circuit to perform the mode of spatial crop on the data according to the determined input or output crop offsets.

18. The electronic device of claim 17, the electronic device further comprising:

a read circuit configured to fetch input data from the system memory and store the input data to a buffer; and a write circuit configured to write data from the buffer to the system memory.

19. The electronic device of claim 18, wherein the system memory and the buffer each have an associated access granularity, the access granularity of the system memory being larger than the access granularity of the buffer.

20. The electronic device of claim 17, wherein the plurality of modes of spatial crop comprises:

an input cropping mode, wherein the input cropping mode includes extracting a subset of data from an input tensor at an arbitrary position using an input crop offset;

an output cropping mode, wherein the output cropping mode includes writing the data to a buffer using an output crop offset; and a spatial tiling mode, wherein the spatial tiling mode is a function of the input cropping mode and the output cropping mode.

* * * * *